Dec. 5, 1961
R. L. FREEMAN
3,012,179
POWER FAILURE INDICATING DEVICE
Filed Dec. 23, 1957
2 Sheets-Sheet 2
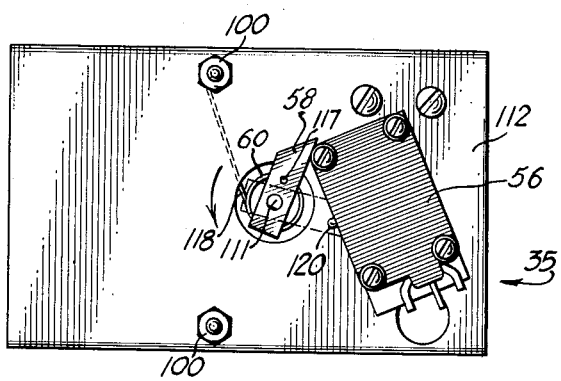
Fig. 2
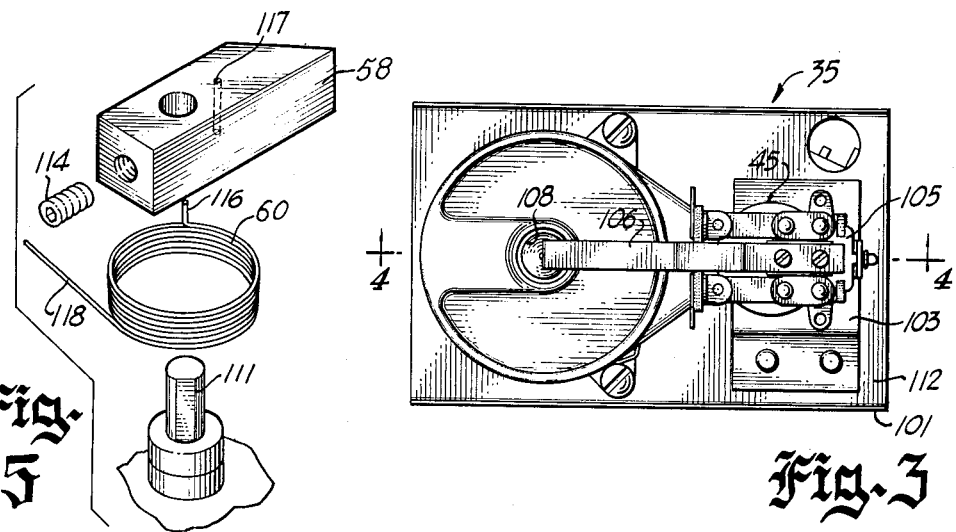
Fig. 5
Fig. 3
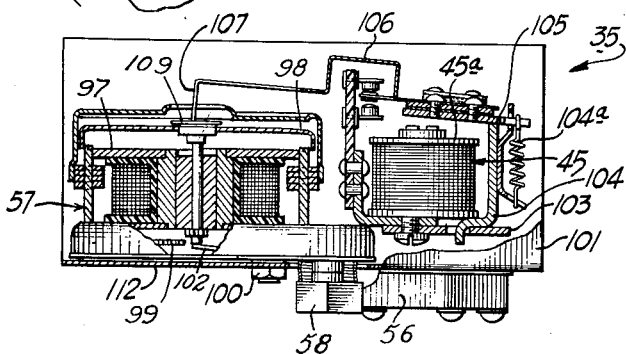
Fig. 4
INVENTOR.
ROBERT L. FREEMAN
BY
Mason, Kolehmainen, Rathburn and Wyss
ATTORNEYS.

United States Patent Office 3,012,179
Patented Dec. 5, 1961

3,012,179
POWER FAILURE INDICATING DEVICE
Robert L. Freeman, Glenview, Ill., assignor to A. C. Nielsen Company, a corporation of Delaware
Filed Dec. 23, 1957, Ser. No. 704,469
10 Claims. (Cl. 318—445)

The present invention relates to devices for indicating power failures, and more particularly to such devices as are suited for use in connection with apparatus for recording wave signal receiver monitoring information on a photographic film with respect to time.

In order to determine the effectiveness of radio and television advertising, it is desirable to monitor the use of a selected number of radio and television receivers so as to accumulate a set of data from which a survey organization may calculate the approximate number of receivers in a given area which were used to receive the programs in question. It has been determined that the best way in which to obtain this data is by using automatic apparatus which is operatively attached to each of the receivers in a sample and which provides a complete record of the operating conditions of the associated receivers.

The assignee of the present invention has, for many years, used automatic wave signal receiver monitoring apparatus of this type to determine the effectiveness of radio and television advertising and in those devices which are presently in use and which are described in copending application, Serial No. 147,302, Krahulec, filed March 2, 1950, now Patent No. 2,838,359, the operating condition data of each receiver is recorded on a photographic recording tape which is continually driven at a constant speed by a synchronous motor and on which reference marks are placed once each minute along one side of the tape. These reference marks, which are hereinafter referred to as minute marks, are placed on the tape by selectively exposing a small portion of the tape to light, once each minute, by means of a lamp, the same lamp being used for exposing other transverse portions of the film in accordance with the operating condition of the receiver.

The record tape is thus graduated longitudinally by the minute marks, and consequently, correlation of the operating condition information with respect to time is facilitated. Since, however, the tape is driven by an electric motor and the record tape is exposed by an electric lamp, if the power to the recorder is interrupted for a period of time, the tape is no longer graduated with respect to time.

Because power failures occur in the homes in which receivers to be monitored are located, means should be provided in the recording apparatus so that when a power failure occurs the information which is recorded on the photographic recording tape before the failure and that which is recorded after the failure can be correlated with respect to time irrespective of the stoppage of the tape drive motor. Otherwise, all of the information on the tape, at least that information following the power failure, would be of no use and unless the duration of the power failure could be determined, all of the information recorded on the tape might be erroneous. As is disclosed in Krahulec Patent 2,801,896, a mechanical time marker may be associated with each recording unit for completing the energization circuit for the exposure lamp at predetermined times irrespective of power failures in the home. In the commercial embodiment of this system, the lamp circuit is completed through the mechanical time marker once each hour, once each day, and once each week, so as to place on the record film a unique identification mark, if, of course, power is supplied to the unit at the time that the lamp circuit is so completed. It may thus be seen that the occurrence of a power failure is thus indicated on the record tape by the fact that the mechanical time marks are spaced apart by less than the corresponding number of minute marks. For example, if no power failures occur, the hour marks produced by the mechanical time marker will be spaced apart by sixty of the minute marks, while if a power failure of, for example, ten minutes occurs, the two hour marks which were respectively recorded before and after the power failure will be spaced apart by only fifty minute marks. It is thus apparent to a person transcribing the data from this record tape that one or more power failures totaling ten minutes occurred during the hour demarcated by the hour marks in question. Therefore, the receiver operating condition information which is recorded on the tape between the two hour marks which straddle the power outage is incomplete since it is not correlated with respect to time. If, however, the exact time at which each power failure is terminated is recorded on the film, then the duration of the power failure can be determined by counting the number of minute marks from the first hour mark up to the power failure and counting the number of minute marks following the power failure up to the second hour mark. Therefore, all of the data which is recorded on the tape becomes significant. Moreover, the only information which could possibly be lost is that which concerns the operation of the receiver during the power failure, and since it is obvious that the receiver could not be used during the power failure, no information whatever is lost with this system. Although means could, of course, be provided for recording on the film the time when each power failure is initiated, it is preferable, for purposes of economy, to record the time at which each power failure is terminated so that the exposure lamp and associated circuitry may be used for this purpose.

The principal object of the present invention is to provide a new and improved device for recording on the record film the occurrence of power failures and, moreover, for recording the exact time at which each power failure is terminated.

A further object of the present invention is to provide a power outage indicating device which is reliable in operation even though it is used very infrequently.

A further object of the present invention is to provide new and improved apparatus for providing a record of a power failure, which record is indicative of the exact time that the power failure was terminated and which is readily apparent to a person or sensing apparatus transcribing data from the record.

Very briefly, the above and further objects are realized in accordance with the present invention by providing a motor driven time delay power outage device which maintains the exposure lamp energized throughout a predetermined length of time following each power failure so as to record on the tape a readily apparent power outage mark.

In a preferred embodiment of the present invention, such a power outage device comprises as its principal elements a constant speed motor, a switch, a cam driven by the motor for selectively operating the switch, a cocking mechanism for biasing said cam in a rest position so that upon initial energization of the motor a predetermined length of time expires before the switch is actuated, and a relay or the like which is energized upon the actuation of the switch to deenergize the motor and place a brake on the cam to prevent its being moved by the cocking mechanism to the rest position. A signal producing means, preferably in the form of a set of contacts on the relay, is provided for completing the lamp energization circuit while the motor is energized so that upon the termination of a power failure the lamp is energized until the switch is actuated and the motor is deenergized. When another power failure occurs, the brake is deenergized, such as by the release of the relay, and the cocking mechanism moves the cam to the rest position so that upon termination of this power failure the lamp is again energized throughout the predetermined length of time required for the cam to be moved by the motor from the rest position to the switch actuating position.

The invention, both as to its organization and operation, together with further objects and advantages thereof, will best be understood by reference to the following detailed description taken in connection with the accompanying drawings, in which:

FIG. 2 is a top plan view of a power failure indicating device embodying the present invention;

FIG. 3 is a bottom plan view of the device of FIG. 2;

FIG. 4 is a sectional view taken along the line 4—4 of FIG. 3; and

FIG. 5 is an exploded view of a portion of the device of FIGS. 2 to 4.

Figure 1:
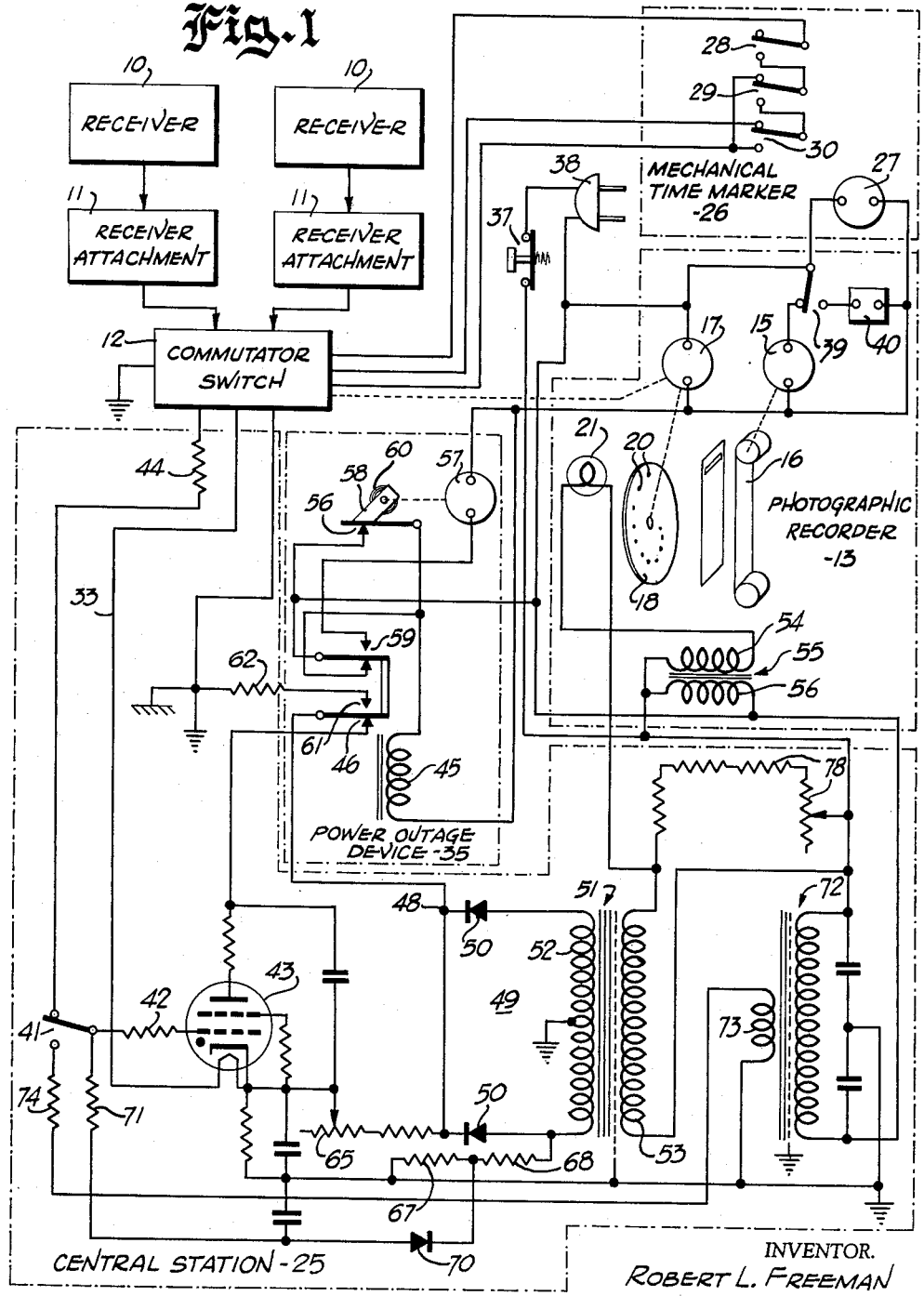
FIG. 1 is an electric circuit diagram of wave signal receiver monitoring apparatus embodying a power failure indicating device of the present invention.

Referring now to the drawings, and particularly to FIG. 1 thereof, there is shown in schematic form an electric control circuit for monitoring apparatus for recording data indicative of the operating condition of a plurality of wave signal receivers 10 which are located in a single home. Similar apparatus is provided in a large number of other homes so that the data accumulated in these homes may be used to determine the listening habits of users of wave signal receivers. The receivers 10 are respectively connected to receiver attachments 11 which produce electrical signals indicative of the operating conditions of the associated receivers for translation to a commutator switch 12 which selectively connects these signals to a photographic type data recorder device 13.

The recorder 13, which is of the type disclosed in the above referred to Krahulec Patent No. 2,838,359, comprises as its principal components an electric film drive motor 15 which drives a light sensitive film 16 through an exposure station at a constant speed, and a drive motor 17 which rotates a scanning disc 18 having a plurality of spirally arranged apertures 20 between the portion of the film 16 which is in the exposure station and an exposure lamp 21. As is more fully described hereinafter, the motors 15 and 17 are continually energized during those times at which power is supplied to the recorder, and the lamp 21 is selectively energized by the signals from the commutator switch. The commutator switch 12 and the scanning disc 18 are driven in synchronism, preferably by the same motor 17, so that the apertures 20 are each respectively disposed between the lamp 21 and the film 16 for a corresponding one of the signals from the attachments 11. As described in detail in a copending patent application, Serial No. 381,344, Currey, filed September 21, 1953, now Patent No. 2,881,417, and assigned to the same assignee as is the present invention, the commutator switch 12 comprises a plurality of segments to which the signals from the attachments 11 are selectively connected and the wiper is driven over the segments in synchronism with the scanning disc 18. Accordingly, each time that the wiper engages an energized segment, the lamp 21 is energized and the film 16 is exposed. Since the operating conditions of the receivers are indicated by the ones of the segments which are energized, and since a different one of the apertures 20 is provided for each contact segment, the transverse positions of the exposed portions of the film are indicative of the operating conditions of the receivers 10 at the time that the exposures were made.

Although the output signals from the commutator switch 12 could be supplied directly to the lamp 21, preferably and as described in a copending application, Serial No. 554,693, Freeman and Currey, filed December 22, 1955, now Patent No. 2,884,567, longer lamp life can be obtained by maintaining the lamp 21 at least partially energized at all times. Accordingly, the output signals from the commutator switch 12 which selectively completes the energization circuit of the exposure lamp 21, are supplied to a central station box 25 which may be located either directly at the receiver or at some remote point and which controls the power for energizing the lamp 21 in response to the signals supplied thereto from the attachments 11. In addition to the contact segments of the commutator switch 12 which are connected to the attachments 11, a number of other segments are used to place time marks on the film 16. This latter group of segments includes a minute mark segment which is directly connected through a conductor 33 to a source of voltage in the central station 25, and additional segments which are connected to a mechanical time marker unit 26. The unit 26 energizes the associated segments of the switch 12 for predetermined intervals of time once each hour, day, and week, and comprises as its principal components an electrically driven motor 27, and cam operated hour, day, and week switches 28, 29, and 30, respectively. The motor 27 is of the type which includes a mechanically wound spring so that in the event of a power outage that causes deenergization of the motor 27, the previously wound spring continues to dirve the associated camming mechanism so that the switches 28, 29, and 30 are closed at the proper times, irrespective of an interruption of power to the system. Accordingly, during those time intervals that the switches 28, 29, and 30 are actuated by the cam associated with the motor 27, the energization circuit of the lamp 21 is periodically completed to place timing marks at appropriate locations on the film 16, if, of course, power is supplied to the system at these times. It should be noted that the time reference marks are placed on the film only when power is supplied to the system and, moreover, that even when a power failure occurs all of the minute marks which are placed on the film 16 are spaced apart by an equal distance thus giving no indication whatever that a power failure has occurred. Because, however, of the hour, day, and week marks which are also placed on the film by operation of the mechanical time marked unit 26, correlation of the receiver operating condition data recorded on the film can be readily accomplished.

If, for example, a power failure occurs which has a duration of less than one hour and which is fully located between two hour marks, a study of the record film will show that less than sixty minute marks are positioned between the hour marks in question and, therefore, that a power failure has occured within the hour demarcated by these hour marks. However, the exact time at which the power outage occurred is not shown. In order to provide on the record film an indication of the time of the power outage, there is provided a time delay power outage device 35 which is rendered effective at the termination of a power outage to cause the energization of the exposure lamp 21 in a unique manner so as to provide on the film an indication that a power outage has occurred and was terminated at the time corresponding to the position of the power outage mark on the tape. Therefore, by counting the minute marks on the tape which occur between the power outage mark and the two adjacent hour marks, the exact time at which the power outage occurred and the exact time it was terminated can readily be determined. Therefore, all of the information contained on the tape between the hour marks can be correlated with respect to time and is, therefore, useful.

Considering now the system of FIG. 1 in greater detail, the motor 17, which drives the wiper of the commutator switch 12 as well as the scanning disc 18, is connected through a normally closed power outage control switch 37 across a plug-in type connector 38 which is adapted to be connected in a wall socket and, therefore, across a power line. Accordingly, whenever power is supplied to the wall socket and, therefore, to the connector 38 and the switch 37 is closed, the motor 17 is energized thereby to drive the disc 18 and the wiper of the commutator switch 12 in synchronism with one another. Moreover, the film drive motor 15 is also energized at this time through a simple two-way switch 39 which connects the motor 15 across the power lines whenever a magazine containing the film 16 is in the recorder. When the magazine is removed from the recorder to replace the film 16, which is done periodically by the collaborator in the home, the switch 39 is automatically actuated to its other position which disconnects the motor 15 from the power line and in its place connects an alarm or buzzer 40. In this way the collaborator does not forget to replace the removed magazine with the new one. Therefore, under normal operating conditions, with power being supplied through the connector 38, the motors 15 and 17 are continually energized and the film 16 is exposed in accordance with the operating conditions of the receivers 10. Assuming that as the wiper of the commutator switch 12 is scanning the associated contact segments it engages an energized segment, which in a device built in the accordance with the present invention had a voltage of approximately 20 volts with respect to ground. This 20-volt signal is coupled from the commutator switch through a noise suppressor resistor 44, a simple two-way switch 41 and a resistor 42 to the control grid of a thyratron 43. Assuming that no power outage has occurred in quite some time, a relay 45 in the power outage device 35 is energized so as to hold a set of normally open contacts 46 closed, thereby to connect the plate circuit of the thyratron 43 to an output terminal 48 of a full-wave rectifier power supply 49. Accordingly, the anode circuit of the thyratron 43 is energized.

As shown, the power supply 49 includes a pair of rectifiers 50 connected back-to-back across the secondary winding 52 of a transformer 51 having a primary winding 53. The primary winding 53 is serially connected with the lamp 21 across the secondary winding 54 of a power transformer 55 having a primary winding 56 connected through the switch 37 across the connector 38. As described in the above referred to Freeman et al. copending application, when the wiper of the switch 12 engages an energized segment, the thyratron 43 is fired which causes an increase in the current through the primary winding 53 and, hence, increases the current in the lamp 21 to a value above the actinic level of the film 16. At those times when the thyratron 43 is nonconductive, the current in the lamp 21, and thus the light therefrom, is below the actinic level but does, nevertheless, have a substantial value.

With power having been supplied to the recorder for a few minutes or more, the power outage relay 45 is energized through a normally open switch 56 which is held closed by a cam 58. The cam 58 is driven by a time delay motor 57 which is serially connected with a set of normally closed contacts 59 of the relay 45 across the connector 38. A spring 60 biases the cam 58 toward a rest position out of engagement with the switch 56 and is effective upon the deenergization of both the motor 57 and the relay 45 to move the cam 58 to the rest position. This will, of course, occur whenever power is removed from the connector 38.

Assume that the power outage device 35 is in the position shown and a power failure occurs. The motor 57 and the relay 45 are thus deenergized to permit the spring 60 to move the cam 58 to its rest position away from the switch 56. Opening of the switch 56 interrupts the energization circuit for the relay 45. At the termination of the power failure, the motor 57 is energized through the set of contacts 59 on the relay 45 and, of course, the other motors 15 and 17 are also energized. The relay 45 remains deenergized by virtue of the fact that the switch 56 is open and the lamp 21 is energized since a resistor 62 having a relatively low resistance is connected through a set of normally closed contacts 61 on the relay 45 across the power supply 49. Moreover, in order to prevent the provision of an excessive amount of current in the lamp 21, the contacts 46 are open to deenergize the anode circuit of the thyratron 43. The system remains in this condition of operation until the cam 58 has been moved by the motor 57 into engagement with the switch 56 and the lamp 21 is thus energized while every one of the apertures 20 in the disc 18 passes between it and the film 16 thereby to place across the film a transverse mark which is readily distinguishable as a power outage indication inasmuch as the possibility of such a signal occurring because of the particular tuning conditions of all the associated receivers is extremely remote. In order to make certain that the operator does not miss this power outage indication, the time delay period during which the switch 56 is held open is greater than the time required for the scanning disc to make two complete revolutions so that at least two transverse lines are placed side-by-side across the film 16 at the time at which the power outage is terminated.

Because of the various appliances which are located in the home, rapid, but substantial, reductions in the current supplied to the connector 38 may occur, but because of the natural time delay or inertia of the relay 45, it remains picked up and the cam 58 is locked in place throughout these normal drops in current value.

If resistor type binary matrices units, such as disclosed in the above-identified Currey Patent No. 2,881,417, are used in the receiver attachments 11, in addition to the segments of the switch 12 which are energized by the desirable signal voltage, there will be a number of the contact segments having undesirable voltages thereon. These undesirable voltages are appreciably less than the desirable signal voltages but since they do have a substantial value means must be provided to prevent the erroneous firing of the thyratron 43 by these low voltage signals. Accordingly, an adjustable biasing arrangement including a variable resistor 65 is interconnected between the power supply 49 and the cathode of the thyratron 43, and the control grid of the tube 43 is connected to a voltage divider comprising a pair of resistors 67 and 68 through a rectifier 70 and a resistor 71. Therefore, adjustment of the value of the resistor 65 alters the bias provided on the tube between the control electrode and the cathode.

In order to facilitate the adjustment of the value of the resistor 65 to a level at which the undesired signals are discriminated against, a transformer 72, which is connected across the input to the system, has a very accurately wound secondary winding 73 which is serially connected with a resistor 74 between ground and one of the terminals of switch 41 so as to enable the supplying of a voltage of known value to the control grid of the thyratron 43. It should be noted that the primary winding of the transformer 72 is supplied with an unregulated voltage so that variations in the value of the power line voltage do not require readjustment of the bias voltage on the tube 43. When the system is being initially installed by a serviceman, the switch 41 is thrown to the lowermost calibrate position so that the voltage from the secondary winding 73 of the transformer 72 is connected through the control grid of the thyratron 43. This voltage is preferably selected to have a value equal to the geometric mean between the values of the desired and the undesired voltage signals which are supplied from the commutator switch 12. With the calibration voltage thus supplied to the grid of the thyratron 43, the resistor 65 is adjusted so that the thyratron 43 just fires. The switch 41 is then positioned in the normal operating position, that shown in the drawing, and the undesired voltage signals will not fire the thyratron 43 whereas the desired signals which are appreciably stronger than the calibrate voltage will cause the thyratron 43 to fire. A variable resistor network 78 is connected across the primary winding 53 of the lamp control transformer 51 so as to enable adjustment of the current through the lamp 21 when the thyratron 43 is conductive. This provides a voltage adjustment which enables compensation for the various tolerances which are permitted in the values of the circuit parameters employed in this system.

The power outage switch 37 which is normally biased in the closed position is provided so as to enable a serviceman to place a power outage mark on the record film 16. Since the serviceman keeps an accurate record of the times at which the switches 37 are released in the various units in an overall system, the survey organization may determine the accuracy at which each recorder 13 is operating.

Referring now to FIGS. 2–5 where there is shown in more detail the power outage device 35. As there shown, a conventional timer motor and gear reduction unit 57 is mounted by a plurality of bolts 100 on a suitable channel shaped support member or chassis 101. The motor 57 is of the pull-in or shifting type wherein the rotor 98 is connected to the associated gear train including an input gear 99 only when the stator 97 is energized, a suitable spring 102 being provided within the unit for biasing the rotor 98 away from the stator 97 and out of engagement with the gear train. Accordingly, when the stator is energized, a magnetic pull is exerted on the armature which moves it more closely to the stator and, moreover, couples the rotor to the gear train. Since motors of this type are well known in the art and commercially available from a number of sources, a detailed description thereof is not given herein.

Mounted adjacent to the motor 57 on a suitable bracket 103, which is secured to the chassis 101, is the power outage relay 45. Briefly, the relay 45 comprises a frame 104 to which is secured the relay stator 45a and an armature 105. The armature 105 is pivotally attached to the frame 104 and is biased out of engagement with the stator 45a by a spring 104a. A resilient arm 106 is fixedly connected to the armature 105 and has an offset end portion 107 which extends through a suitable aperture 108 in the casing of the motor 57 to engage an end portion 109 of the rotor 98. The rotor is biased, by means internal of the motor unit 57, to the position shown in FIG. 4 and when the motor is energized, the rotor is pulled downwardly into engagement with the gear train. Of course, the end portion 109 moves downwardly at this time. When, however, the motor is deenergized and the relay 45 is energized, the armature 105 is held in engagement with the stator of the relay and the end portion 107 engages the end 109 of the rotor and pushes it downwardly so as to hold the rotor in engagement with the gear train thus to prevent rotation of an output shaft 111 as described hereinbefore in connection with FIG. 1. The output shaft 111 from the gear train extends through a suitable aperture in the web portion 112 of the U-shaped chassis 101 and a camming member 113 is secured to the shaft 111 by means of a set screw 114. A coil spring 60 loosely surrounds the shaft 111 and has an axially directed protruding end portion 116 which is positioned in a hole 117 drilled in the cam member 58 adjacent to and in alignment with the hole through which the shaft 111 extends. The other end 118 of the coil spring 60 extends tangentially of the coil a substantial distance therefrom so as to engage one of the bolts 100 to prevent rotation of the cam in a counterclockwise direction as viewed in FIG. 5. The spring 60 therefore biases the cam 58 in a clockwise direction, as viewed in FIG. 2, toward a rest position at which the cam 58 engages the housing of the switch 56, the switch 56 being a conventional microswitch. When the motor is energized, the shaft 111 rotates counterclockwise, as viewed in FIG. 2, to move the cam 58 to the position indicated in dotted lines so as to engage an actuating member 120 of the switch 56. The operation of this unit has been described above in connection with FIG. 1.

While a particular embodiment of the invention has been shown, it will be understood, of course, that the invention is not limited thereto, since many modifications may be made, and it is, therefore, contemplated by the appended claims to cover any such modifications as fall within the true spirit and scope of the invention.

What is claimed as new and desired to be secured by Letters Patent of the United States is:

1. A time delay device for use in a photographic type recording apparatus for providing an indication of a power failure, said time delay device comprising a constant speed motor including a stator and a rotor, a speed reduction gear train, a gear mounted on said rotor for effective engagement with the input gear of said gear train, resilient means exerting an axial force on said rotor for biasing said rotor toward a location exterior of said stator when said motor is denergized, the strength of said resilient means being such that the magnetic pull on said rotor when said motor is energized is sufficient to move said rotor against the force exerted thereon by said resilient means into the field of said stator so as to move the gear on said rotor into engagement with said input gear, a relay including an operating winding and a set of normally closed contacts, said contacts being serially connected in the energization circuit of said motor so that said motor is energized when said relay is deenergized, a switch, means for biasing said switch in a normally open position, said switch being serially connected in the energization circuit of said relay winding, an actuating member fixedly connected to the output of said gear train and movable by said gear train into engagement with said switch to close said switch and thereby operate said relay, said switch being positioned in the path of movement of said actuating member so as to interrupt the rotation of said member in the direction in which it is driven by said motor, a stop member fixedly mounted in the path of said actuating member to limit rotation thereof in a direction opposite to the direction in which it is driven by said motor, spring means effectively connected to said actuating member for urging said member in a direction opposite to that direction in which it is driven by said motor thereby to bias said member against said stop, the movement of said actuating member between said switch and said stop which is effected by said spring means being at a speed which is substantially greater than the speed of movement of said actuating member between said stop and said switch as effected by said motor, means effectively engageable by the armature of said relay when said winding is energized for urging said rotor into the position at which the gear which is mounted on said rotor effectively engages said input gear thereby to place on said gear train a load which prevents said spring means from moving said actuating member out of engagement with said switch, and means for indicating when said switch is closed.

2. A time delay device as set forth in claim 1 wherein said last-named means comprises at least one set of contacts on said relay.

3. A time delay device comprising a constant speed motor including a stator and a rotor, a speed reduction gear train, a gear mounted on said rotor for effective engagement with the input gear of said gear train, resilient means exerting an axial force on said rotor for biasing said rotor toward a location exterior of said stator when said motor is deenergized, the strength of said spring means being such that the magnetic pull on said rotor when said motor is energized is sufficient to move said rotor against the force exerted thereon by said resilient means into said stator so as to move the gear on said rotor into engagement with said input gear, a relay including an operating winding and a set of normally closed contacts, said contacts being serially connected in the energization circuit of said motor so that said motor is energized when said relay is energized, a switch, means for biasing said switch in a normally open position, said switch being serially connected in the energization circuit of said relay winding, an actuating member fixedly connected to an output shaft of said gear train and rotatable by said gear train into engagement with said switch to close said switch and thereby operate said relay, said switch being fixedly positioned in the path of movement of said actuating member so as to stop the rotation of said member in the direction in which it is driven by said motor, a stop fixedly mounted in the path of movement of said actuating member to limit the rotation of said member in a direction opposite to that in which said member is rotated by said motor, spring means connected to said actuating member for urging said member in an angular direction opposite to that direction in which it is rotated by said motor thereby to bias said member against said stop at a fixed predetermined arcuate distance from said switch, the speed of movement of said actuating member between said switch and said stop which is effected by said spring means being substantially greater than the speed of movement of said actuating member between said stop and said switch which is effected by said motor, and means responsive to the closing of said switch for urging said rotor into the position at which the gear which is mounted on said rotor effectively engages said input gear to place a load on said gear train which prevents said spring means from moving said actuating member out of engagement with said switch.

4. A time delay device for providing an indication of a power failure, said time delay device comprising a constant speed motor including a stator and a rotor, a speed reduction gear train, means responsive to the energization of said motor for connecting said rotor to the input of said gear train, resilient means exerting an axial force on said rotor for biasing said rotor out of effective engagement with said gear train, the strength of said resilient means being such that the magnetic pull on said rotor when said motor is energized is sufficient to move said rotor against the force exerted thereon by said resilient means into said stator so as to move said rotor into effective engagement with said train, a relay including an operating winding and a set of normally closed contacts, said contacts being serially connected in the energization circuit of said motor so that said motor is energized when said relay is deenergized, a switch, means for biasing said switch in a normally open position, said switch being serially connected in the energization circuit of said relay winding, an actuating member fixedly connected to the output of said gear train and movable by said gear train into engagement with said switch to close said switch and thereby operate said relay, said switch being positioned in the path of movement of said actuating member so as to interrupt the rotation of said member in the direction in which it is driven by said motor, a stop member fixedly mounted in the path of said actuating member to limit rotation thereof in a direction opposite to that in which it is driven by said motor, spring means connected to said actuating member for urging said member in a direction opposite to that direction in which it is driven by said motor thereby to bias said member against said stop, the speed of movement of said actuating member between said switch said stop which is effected by said spring means being substantially greater than the speed of movement of said actuating member between said stop and said switch which is effected by said motor, means effectively engageable by the armature of said relay when said winding is energized for urging said rotor into the position at which said rotor effectively engages said gear train to place a substantial load on said gear train to prevent said spring means from moving said actuating member out of engagement with said switch.

5. A time delay device for providing an indication of a power failure, comprising a constant speed motor including a stator and a rotor, a speed reduction gear train, resilient means exerting an axial force on said rotor for biasing said rotor out of engagement with said gear train when said motor is deenergized, the strength of said spring means being such that the magnetic pull on said rotor when said motor is energized is sufficient to move said rotor against the force exerted thereon by said resilient means into said stator so as to move said rotor into effective engagement with said gear train, a relay having a set of normally closed contacts, said contacts being serially connected in the energization circuit of said motor so that said motor is energized when said relay is deenergized, a switch, means for biasing said switch in a normally open position, said switch being serially connected in the energization circuit of said relay winding, means responsive to the output of said gear train for closing said switch thereby to operate said relay when said motor has been energized for a predetermined period of time, and means effectively engageable by the armature of said relay when said winding is energized for urging said rotor into the position at which said rotor effectively engages said gear train to place a load on said gear train when said motor is deenergized and power is supplied to said device.

6. In a time delay device of the type used in recording apparatus for providing an indication of a power failure, the combination of a constant speed motor including a stator and a rotor, a speed reduction gear train, a gear mounted on said rotor for effective engagement with the input gear of said gear train, resilient means exerting an axial force on said rotor for biasing said rotor toward a location exterior of said stator when said motor is deenergized, the strength of said spring means being such that the magnetic pull on said rotor when said motor is energized is sufficient to move said rotor against the force exerted thereon by said resilient means into said stator so as to move the gear on said rotor into engagement with said input gear, a solenoid, an energy storage device connected to the output of said gear train, and means effectively engageable by the armature of said solenoid when said solenoid is energized for urging said rotor into the position at which the gear mounted on said rotor effectively engages said input gear to place a load on said gear train which prevents said energy storage device from driving said gear train when said motor is deenergized and power is supplied to said device.

7. A time delay device of the type used in recording apparatus which records an indication of a power failure, the combination of a constant speed motor including a stator and a rotor, a speed reduction unit, resilient means for biasing said rotor out of engagement with the input of said speed reduction unit, means for overcoming the force of said resilient means for connecting said rotor to the input of said speed reduction unit when said motor is energized, a solenoid including an operating winding and an armature, and means effectively engageable by said armature when said winding is energized for connecting said rotor to said speed reduction unit to place a load on said unit which prevents driving thereof from the output side.

8. Apparatus for indicating an electric power failure after power has been restored, which indication is effected through a predetermined time interval, said apparatus comprising a constant speed motor, a speed reduction unit including an output member, means responsive to the energization of said motor for connecting the rotor of said motor to the input of said speed reduction unit, means for biasing the rotor of said motor out of effective engagement with the input of said speed reduction unit, electrically energizable means responsive to the output of said speed reduction unit for deenergizing said motor when said output member of said speed reduction unit is in a predetermined position, spring means for biasing said output member away from said predetermined position, and electrically energized means for maintaining said rotor connected to the input of said speed reduction unit when said output member is in said predetermined position and there is no power failure, whereby said motor is energized for a predetermined time interval commencing at the time that power is restored following a power failure.

9. In a power outage responsive device for providing an indication of a power outage for a predetermined time interval commencing with the restoration of power following a power failure, the combination of a constant speed motor, a speed reduction unit including an output member, means for connecting said motor to the input of said unit when said motor is energized, biasing means for biasing said motor out of effective engagement with said speed reduction unit, a spring effectively connected between said stator and the output of said unit for exerting a force on said ouput opposite to the force exerted by said motor, means responsive to the output of said motor and operative following the energization of said motor for a predetermined time inetrval for interrupting the energization circuit of said motor and for maintaining the connection between said motor and said speed reduction unit, and means responsive to a power failure for rendering said last named means inoperative whereby the energization circuit of said motor is completed and said biasing means disengages said motor from said speed reduction unit when a power failure occurs.

10. In a power outage device, a motor, a speed reduction unit, first means for connecting said motor to the input of said unit whenever said motor is energized, second means responsive to the output of said unit and operative after said motor has been energized for a predetermined time interval for deenergizing said motor, third means for maintaining said motor connected to said speed reduction unit after said predetermined time interval only so long as no power failure recurs, and fourth means responsive to a power failure for rendering said second means ineffective.

References Cited in the file of this patent
UNITED STATES PATENTS

| | | |
|---|---|---|
| 2,538,732 | Macgeorge | Jan. 16, 1951 |
| 2,812,486 | Foster | Nov. 5, 1957 |
| 2,833,976 | Kennedy et al. | May 6, 1958 |